(12) United States Patent
Wichers

(10) Patent No.: US 7,886,977 B2
(45) Date of Patent: Feb. 15, 2011

(54) OPTICAL SENSOR FOR DETECTING A CODE ON A SUBSTRATE

(75) Inventor: Hermen Jan Wichers, Malden (NL)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 11/958,902

(22) Filed: Dec. 18, 2007

(65) Prior Publication Data
US 2008/0265036 A1 Oct. 30, 2008

(30) Foreign Application Priority Data
Jan. 5, 2007 (EP) ................................ 07075007

(51) Int. Cl.
*G06K 7/10* (2006.01)
*G06K 7/14* (2006.01)

(52) U.S. Cl. ....................................... 235/454; 250/555

(58) Field of Classification Search ................. 235/454, 235/455, 462.42, 462.06; 250/214 AL, 214 B, 250/555, 556; 356/71, 445–448
See application file for complete search history.

(56) References Cited

U.S. PATENT DOCUMENTS

| | | | | | |
|---|---|---|---|---|---|
| 3,892,492 | A | * | 7/1975 | Eichenberger | ............... 356/434 |
| 4,537,504 | A | * | 8/1985 | Baltes et al. | ................... 356/71 |
| 5,304,813 | A | * | 4/1994 | De Man | ........................ 250/556 |
| 5,359,185 | A | * | 10/1994 | Hanson | ........................ 235/454 |
| 5,477,332 | A | * | 12/1995 | Stone et al. | .................. 356/613 |
| 5,497,234 | A | * | 3/1996 | Haga | ........................... 356/613 |
| 5,686,720 | A | * | 11/1997 | Tullis | ....................... 250/208.1 |
| 5,877,507 | A | | 3/1999 | Shinomiya | |
| 6,000,615 | A | * | 12/1999 | Spitz | ..................... 235/462.01 |
| 6,019,287 | A | * | 2/2000 | Mann | .......................... 235/454 |
| 6,039,254 | A | * | 3/2000 | Froese-Peeck et al. | . 235/462.32 |
| 6,291,829 | B1 | * | 9/2001 | Allen et al. | ............ 250/559.07 |

(Continued)

FOREIGN PATENT DOCUMENTS

EP     1489395 A1     12/2004

(Continued)

OTHER PUBLICATIONS

European Patent Office, European Search Report in EP Application No. 07075007, Jun. 5, 2007.

*Primary Examiner*—Michael G Lee
*Assistant Examiner*—Suezu Ellis
(74) *Attorney, Agent, or Firm*—Wood, Herron & Evans, L.L.P.

(57) ABSTRACT

Optical sensor for detecting a code on a substrate which, in use, moves with respect to the optical sensor. The sensor comprises an optical detector for determining a value of a reflective property of the substrate, wherein the optical detector views the substrate along an optical axis, a code analyser for determining the detected code on the basis of a variation of the value of the determined reflective property in time, a first illumination source for illuminating the substrate along the optical axis, a second illumination source for illuminating the substrate in a direction at a non-zero angle with respect to the optical axis, and a control unit having a first operational mode wherein the first illumination source switched on and the second illumination source is switched off, and having a second operational mode wherein the first illumination source is switched off and the second illumination source is switched on.

21 Claims, 3 Drawing Sheets

U.S. PATENT DOCUMENTS

| | | | |
|---|---|---|---|
| 6,327,374 B1 * | 12/2001 | Piironen et al. | 382/108 |
| 6,473,165 B1 * | 10/2002 | Coombs et al. | 356/71 |
| 7,242,463 B2 * | 7/2007 | Pilloud et al. | 356/71 |
| 2002/0047047 A1 * | 4/2002 | Poloniewicz et al. | 235/454 |
| 2002/0051255 A1 * | 5/2002 | Mooty et al. | 358/509 |
| 2004/0164163 A1 * | 8/2004 | Watanabe et al. | 235/462.25 |
| 2005/0248767 A1 * | 11/2005 | Pilloud et al. | 356/429 |

FOREIGN PATENT DOCUMENTS

| | | | |
|---|---|---|---|
| GB | 2138982 A | * | 10/1984 |
| WO | 94/22104 A1 | | 9/1994 |

* cited by examiner

OPTICAL SENSOR FOR DETECTING A CODE ON A SUBSTRATE

The present application claims the priority of European Patent Application No. 07075007.0 filed Jan. 5, 2007 under 35 U.S.C. §119. The disclosure of that priority application is hereby fully incorporated by reference herein.

TECHNICAL FIELD

The invention generally relates to an optical sensor for detecting a code on a substrate which, in use, moves with respect to the optical sensor.

BACKGROUND

In a known sensor a camera is used to detect a barcode on a substrate. The camera repeatedly forms still images of the substrate and transmits these images to the code analyser. The code analyser performs image processing algorithms to determine the code, e.g., a number associated with the barcode, from the image.

The known optical sensor has the disadvantage that the image rate of the camera is relatively low, so that the system is not suitable for determining a code on a substrate that moves with respect to the camera at high speed. Further, the optical sensor is limited with respect to substrates on which a code can be detected and with respect to ranges of values of the reflective properties within which the sensor may operate. For instance on highly reflective substrates, e.g., comprising a mirror-like surface, the known sensor is unable to detect a code.

It is an object of the invention to at least diminish at least one of the mentioned problems.

SUMMARY

Since the code analyser determines the detected code on the basis of a variation of the value of the determined reflective property in time, it is possible to determine the code when the substrate passes the optical sensor at higher speed, as the image rate of the camera is not a limiting factor. Further, since the control unit has a first operational mode wherein the first illumination source is switched on and the second illumination source is switched off, and a second operational mode wherein the first illumination source is switched off and the second illumination source is switched on, the optical sensor may vary the illumination conditions while detecting the code, so that the optimal illumination conditions can be used for determining the code. Further, since the first illumination source illuminates the substrate along the optical axis, at least one of the illumination conditions causes a large difference between specular and diffuse reflection, so that either a value of a specular or a diffuse reflective property can be determined when illuminating with the first illumination source. Further, this also allows for the optical sensor to be built in a compact way, allowing the sensor to be used in environments, e.g., in machines, which allow little room for the sensor to be present. Further, since the second illumination source illuminates the substrate in a direction at a non-zero angle with respect to the optical axis, the first and second illumination sources illuminate the substrate at mutually different angles, so that a difference in illumination conditions can be optimised.

Here the reflective property may for instance be a colour property, such as hue, chrominance or lightness, an optical density, e.g., grey tone, a texture, or a reflectance, e.g., diffuse or specular reflectance, or a combination of any of these reflective properties.

Herein the term "code" may encompass any piece of information comprising at least one transition from a first value to a second value such as for instance a barcode, a dot code, a length of a section of the substrate of differing reflectivity, a black/white transition or a colour code.

Preferably, the optical axis is arranged substantially perpendicular to the substrate. This provides the advantage that the optical detector views the substrate substantially at a right angle. Hence, the optical sensor is relatively insensitive to variations of a thickness of the substrate or of a height of the substrate with respect to the optical sensor, as these variations do not result in a sideways moving of the substrate within the field of view of the optical detector as seen by the detector. This reduces the risk that the optical sensor misses the code as a result of misalignment due to these variations. Further, when the optical detector views the substrate substantially perpendicularly, and the first illumination source illuminates the substrate substantially perpendicularly, it has been found that also codes can be detected on substrates with a high-reflectivity surface such as a mirror-surface, since the light of the first illumination source is effectively reflected towards the optical detector.

Preferably, the first illumination source is arranged for emitting white light and the second illumination source comprises a plurality of light sources arranged to emit light of mutually different colours. This provides the advantage that with a limited number of illumination colours and a limited number of illumination angles a code can be detected on substantially any substrate, of any colour or any reflectivity. In this case, the second illumination source allows to detect the colour properties of the code, while the combination of the first and second illumination sources allows to detect reflectivity properties of the code. In this way the number of mutually different illumination conditions is limited, which increases the speed of the sensor since less illumination conditions need to be used. At the same time, the advantage is maintained that codes on substantially all kinds of substrates, e.g., having different colour or reflectivity properties, can be detected.

Preferably, the plurality of light sources comprises a red light source for emitting red light, a green light source for emitting green light and a blue light source for emitting blue light. Thus, any colour can be detected.

Preferably, the optical detector comprises a singular photodiode, and not a plurality of photoelectric cells. This provides the advantage that the optical detector can continuously or repeatedly, with a high repetition rate, determine the value of the reflective property of the substrate. Hence, the sensor can determine the code while the substrate moves at a high speed.

Preferably, the control unit is arranged for periodically changing from the first to the second operational mode. Hence the control unit can switch the illumination sources and/or light sources on and off in a cycle.

Optionally, the control unit has a third operational mode wherein the first and the second illumination source are switched off. Hence the optical detector can determine a background level of illumination with al illumination sources of the optical sensor switched off, e.g., for calibration of correction of the detected values. Preferably, the control unit is arranged for cyclically being in the first, second or third operational mode.

According to a second aspect of the invention, the optical sensor is further provided with at least one alignment light source which is arranged adjacent to the photoelectric transducer, and which is arranged to be imaged onto the substrate by the imaging optics. Hence, the optical sensor can easily be aligned with respect to the substrate such that the substrate is imaged at the photoelectric transducer by focussing a projection of the alignment light source onto the substrate.

According to a third aspect of the invention, the optical sensor is further provided with a reference surface which, in use, is positioned behind the substrate when viewed from the optical detector.

DETAILED DESCRIPTION OF THE ILLUSTRATIVE EMBODIMENTS

Figure 1A:
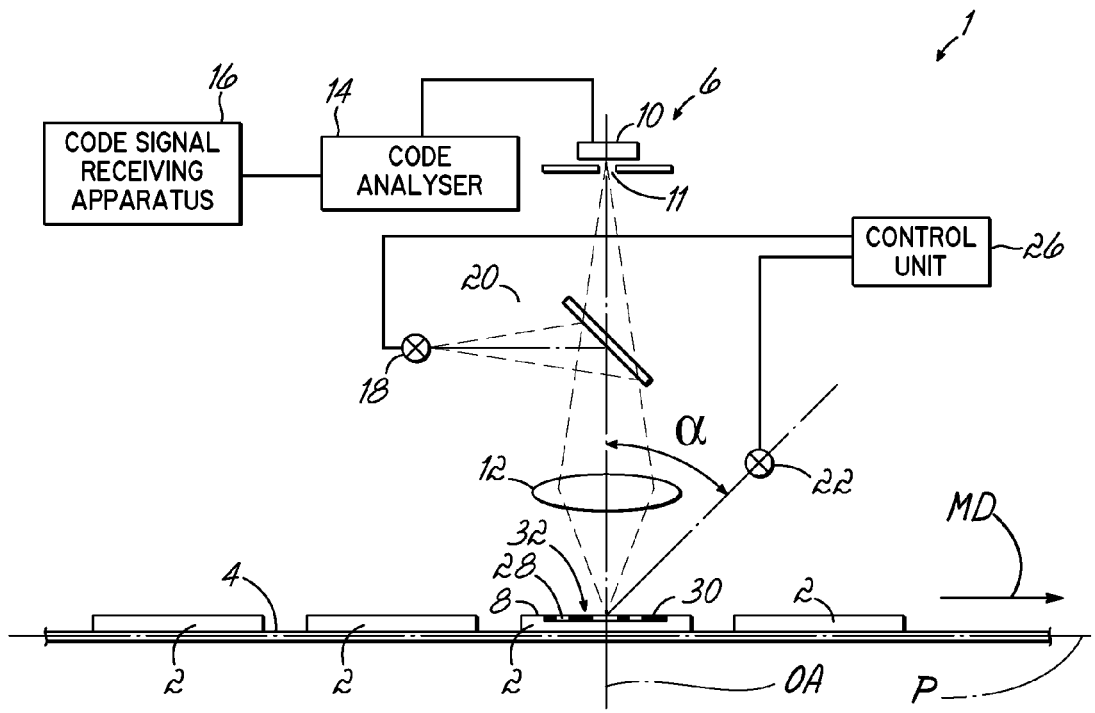
FIG. 1a shows a schematic view of a first embodiment of an optical sensor.

FIG. 1a shows a schematic view of a first embodiment of an optical sensor 1 according to the invention. In the example of FIG. 1a the sensor 1 is arranged adjacent a substrate 2. The optical sensor is arranged to view the substrate 2 along an optical axis OA. In this example the optical axis OA is arranged substantially perpendicular to the substrate 2.

In this example the substrate 2 comprises a substantially flat body, which extends in a plane P, for instance a, e.g., cardboard, blank for a box. The substrate may, for instance, move with respect to the sensor 1. In this example the substrate moves within the plane P. In this example the substrate moves in the moving direction MD in the plane P. Thereto, substrate moving means 4 are provided, e.g., a conveyor belt. In this example the substrate moving means 4 are arranged to move a plurality of substrates 2 such that the substrates consecutively pass the optical axis OA. In this example the plane P is arranged substantially perpendicular to the optical axis OA, so that the substrate 2 moves in a direction substantially perpendicular to the optical axis OA. In this example, the substrate 2 comprises a code, such as a barcode, which may e.g., be printed onto the substrate 2.

In the example of FIG. 1a the optical sensor 1 comprises an optical detector 6. The optical detector 6, in use, views the substrate 2 along the optical axis OA. In order for the optical sensor 1 to be able to determine the code on the substrate 2, it is preferred that the code is present on a surface 8 of the substrate 2 which faces towards the optical detector 6, and that the code, at least partially, is present at a predetermined location on the surface which, while the substrate moves, is intersected by the optical axis OA.

The optical detector 6 is arranged for continuously or repeatedly determining a value of a reflective property of the substrate while it passes the optical axis, at a position where the optical axis OA intersects the surface 8 of the substrate 2 which faces towards the optical detector 6. The reflective property may for instance be a colour property, such as hue, chrominance or lightness, an optical density, e.g., grey tone, a texture or a reflectance, e.g., diffuse or specular reflectance, or a combination of any of these reflective properties. Hence, the code may be applied to the substrate in such a manner that it comprises at least two distinguishable values of the reflective property.

The optical detector is arranged for outputting a signal representative of the value of the determined reflective property. In this example the optical detector 6 comprises a photoelectric transducer 10, such as a photodiode, which converts light incident onto the photoelectric transducer 10 into an electric charge, current and/or voltage. In this example, the optical detector 6 also comprises imaging optics 12, for instance a lens or a plurality of lenses, for imaging the substrate 2 onto the photoelectric transducer 10.

Preferably, the photoelectric transducer is a singular photodiode and not a photoelectric transducer comprising a plurality of photoelectric cells, such as for instance a 1D (linescan) camera or a 2D camera, such as a CCD camera or CMOS camera. It has been found that the short response time of the singular photodiode makes it highly suitable for use in the optical sensor according to the invention, as it allows for fast continuous measurement of the value of the reflective property or of a high sample rate when repeated measurements are required.

In the example of FIG. 1a, the optical detector further comprises an aperture 11, e.g., provided in a substantially non-translucent plate, which is positioned in between the photoelectric transducer 10 and the imaging optics 12. In this example the aperture 11 is located substantially in the focal plane of the imaging optics, and preferably near to the photoelectric transducer 10. The aperture may aid to limit a field of view of the optical detector 6, e.g., to an area on the substrate which coincides with a part of the code. Further, the aperture may be used to enhance an optical resolution of the optical detector 6. The aperture may for instance have a substantially rectangular shape. The aperture may for instance be smaller in a direction parallel to the moving direction MD than it is in a direction perpendicular to the moving direction MD. Preferably, a size of the aperture perpendicular to the moving direction is chosen such that substantially no part of the surface 8 of the substrate 2 adjacent to the code in a direction perpendicular to the moving direction is imaged onto the photoelectric transducer 10 through the aperture 11. Hence, the field of view of the optical sensor 6 can be limited to the code, which enhances sensitivity of the optical sensor for values of the reflective property of the code.

In this example the optical sensor 1 further comprises a code analyser 14 which is arranged to receive the signal output by the optical detector 6, and for determining the detected code on the basis of a variation of the determined value of the reflective property in time. The code analyser may be further arranged to output a code signal representative of the determined code, e.g., to an external apparatus, indicated with 16 in FIG. 1a.

The optical sensor 1 comprises a first illumination source 18, e.g., a light emitting diode (LED), for illuminating the substrate 2 along the optical axis OA of the optical detector 6, in this example in a direction away from the optical sensor 6 towards the substrate 2. Hence, a first optical path extending from the optical detector 6 to the substrate 2 and a second optical path extending from the first illumination source 18 to the substrate 2 at least partially coincide. In this example the optical sensor 1 comprises a beam combiner 20, such as a partially transparent mirror or a prism, for combining a beam of light from the first illumination source 18 into the first optical path of the optical detector 6.

The optical sensor 1 comprises a second illumination source 22 for illuminating the substrate 2 in a direction at a non-zero angle α with respect to the optical axis OA.

In the example of FIG. 1a the optical sensor 1 further comprises a control unit 26 for controlling the first and second illumination source 18,22, as will be further elucidated below.

In this example the code can be considered as a binary code comprising first code-portions and second code-portions. The first code-portion represents a logical high level, and may be formed by a first region 28 on the substrate where the value of the reflective property is higher than a predetermined threshold level. The second code-portion represents a logical low level, and may be formed by a second region 30 on the substrate where the value of the reflective property is lower than a predetermined threshold level. A value of the reflective property as determined by the optical detector will be indicated as "high" when it is higher than the predetermine threshold, and as "low" when it is lower than the predetermined threshold.

In this example, the code comprises a barcode 32 of e.g., black and white bars which are positioned side by side, i.e., with longitudinal sides of the bars abutting. Herein the white bars may form the first regions 28 and the black bars may form the second regions 30. For clarity purposes the barcode 32 is in FIG. 1a schematically indicated in the drawing plane, but it will be appreciated that the barcode 32 is actually present on the surface 8 of the substrate 2.

The optical sensor as described thus far can be used as follows for determining a code on a substrate.

The substrate 2 is moved with respect to the optical sensor 1 in the moving direction MD in the plane P. The barcode 32 is preferably oriented such that a longitudinal direction of the bars is at a non-zero angle with respect to the moving direction MD, e.g., perpendicular to the moving direction. Hence, the black and white bars, i.e., the first and second regions 28,30, consecutively are imaged onto the optical detector 6 when the code passes the optical axis OA.

Figure 1B:
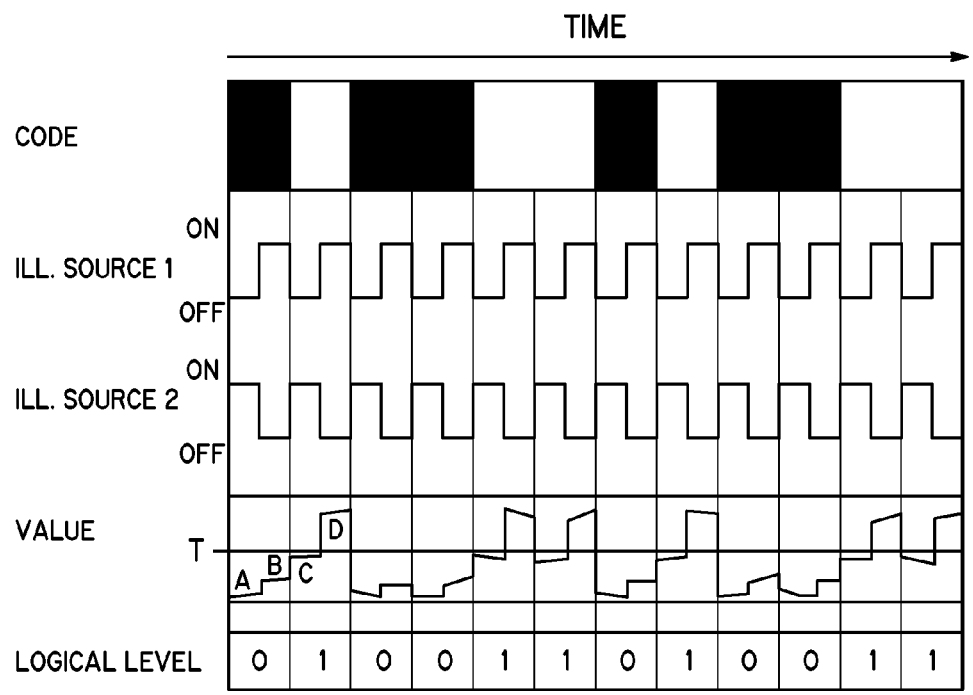
FIG. 1b shows a schematic representation of the functioning of the optical sensor of FIG. 1a in time.

FIG. 1b shows an example of a code comprising black and white portions. In use, the code is scanned across the optical axis OA, so that form the point of view of the code, the optical axis in time scans across the code, e.g., from left to right in FIG. 1b. Thus, FIG. 1b can be considered to show the portion of the code viewed by the optical sensor as a function of time.

The control unit 26 controls the first and second illumination source 18,22. In this example, the control unit 26 has a first operational mode and a second operational mode. In the first operational mode the first illumination source 18 is switched on and the second illumination source 22 is switched off. In the second operational mode the first illumination source 18 is switched off and the second illumination source 22 is switched on. Hence, in this example, the substrate 2 is illuminated by either the first illumination source 18 or the second illumination source 22.

In use, the control unit 26 periodically changes from the first operational mode to the second operational mode. Hence the substrate is alternately illuminated by the first illumination source 18 and the second illumination source 22 in an illumination cycle. FIG. 1b schematically shows at which moments in time the first and second illumination sources 18,22 are switched on or off.

During the illumination cycle, the substrate is imaged onto the optical detector 6. Hence, the optical detector 6 consecutively receives the reflection off the substrate 2 of first light emitted by the first illumination source 18 and second light emitted by the second illumination source 22. The optical detector 6 continuously or repeatedly determines, e.g., measures, a value of the reflective property of the substrate 2.

Hence, the optical detector 6 consecutively determines a value of the reflective property of the first regions 28 and the second regions 30 of the code. FIG. 1b schematically shows an example of the value determined by the optical detector 6 as a function of time. The determined values, or information representative of the values, are transmitted to the analyser 14. Hence, the analyser 14 is provided with a continuous or sampled stream of values of the reflective property which vary in time.

From the continuous or sampled stream of values which varies in time, the analyser constructs a sequence of high and low logical level bits, by comparing the values with the predetermined threshold. The number of consecutive bits of high or low logical level corresponds to the lengths of time that the value of the reflective property was higher or lower than the predetermined threshold, respectively. FIG. 1b shows an example of a sequence of logical levels of bits as determined by the analyser.

In the example of FIG. 1b it can be seen that the value of the reflective property corresponding to a second region 30 when illuminated by the second illumination source 22, as indicated at A in FIG. 1b, need not be identical to the value of the reflective property corresponding to the second region 30 when illuminated by the first illumination source 18, as indicated at B in FIG. 1b. Also, the value of the reflective property corresponding to a first region 28 when illuminated by the second illumination source 22, as indicated at C in FIG. 1b, need not be identical to the value of the reflective property corresponding to the first region 28 when illuminated by the first illumination source 18, as indicated at D in FIG. 1b.

In this example, it is observed that the value of the reflective property corresponding to the first region 28 when illuminated by the second illumination source 22, as indicated at C in FIG. 1b is lower than the predetermined threshold value T. Hence, in this example, when illuminating with the second illumination source 22, the first region 28 cannot properly be distinguished from the second region 30 on the basis of the value of the reflective property. However, it is also observed that when illuminating with the first illumination source 18 the first region 28 can properly be distinguished from the second region 30 on the basis of the value of the reflective property. The analyser 14 may be arranged to determine whether to use the value determined by the optical detector 6 while the first illumination source is on or when the second illumination source is on, e.g., based on a magnitude of the value. In this example the analyser decides to disregard the values detected when the second illumination source is on.

In the example of FIG. 1a, use of the first illumination source 18 and second illumination source 22 allows detection of codes having all kinds of reflectivity properties. It is also possible to detect a code wherein the first region 28 and the second region 30 have substantially the same, e.g., light, colour and brightness, while the first region has a high reflectivity (glossy) and the second region has a low reflectivity (matte). In that case, illumination with the first illumination source may yield little difference in the value of the reflective property of the first and second region 28,30 as perceived by the optical detector 6. Illumination with the second light source 22 will cause light emitted by the second light source to be reflected away from the optical detector 6 by the first region 28 and be reflected (diffusely) towards the optical detector 6 by the second region 30. Hence, the value of the reflective property, when illuminated with the second illumination source 22, will be relatively low for the first region and may be relatively high for the second region, thus allowing detection of the code. It will be appreciated that when the code comprises the first region 28 and the second region 30 having substantially the same dark colour, while the first region has a high reflectivity (glossy) and the second region has a low reflectivity (matte), illumination with the first light source 18 will cause a relatively large amount of light emitted by the first light source to be reflected towards the optical detector 6 by the first region, and a relatively small amount of light to be reflected towards the optical detector by the second region, thus allowing the code to be detected.

According to an aspect of the invention, the optical axis OA is arranged substantially perpendicular to the surface 8 of the substrate 2, as shown in FIG. 1a. This provides the advantage that on a substrate with a highly reflective surface 8, such as a mirror-surface, a high-gloss surface or a metallic surface, illumination with the first illumination source 18, which then will also be substantially perpendicular to the surface 8 of the substrate, may result in a large fraction of the illuminating light being reflected to the optical detector 6, so that a high value of the reflective property may be determined. If the highly reflective surface is provided with second code portions 30 of which the reflective property is low, which are e.g., printed or painted onto the highly reflective surface in black and/or a dark colour, reflection of light from the first and/or second illumination source 18,22 may result in a low value of the determined reflective property. On the other hand, illumination of the highly reflective surface 8 with the second illumination source 22 may result in a large fraction of the illuminating light being reflected away from the optical detector 6, so that a low value of the reflective property may be determined. If the highly reflective surface is provided with first code portions 28 of which the reflective property is high, which are e.g., printed or painted onto the highly reflective surface in white and/or a light colour, reflection of light from the first and/or second illumination source 18,22 may result in a high value of the determined reflective property. Hence, with the optical sensor 1 according to the invention it is possible to detect a code on a highly reflective surface, such as a mirror-surface.

Figure 2A:
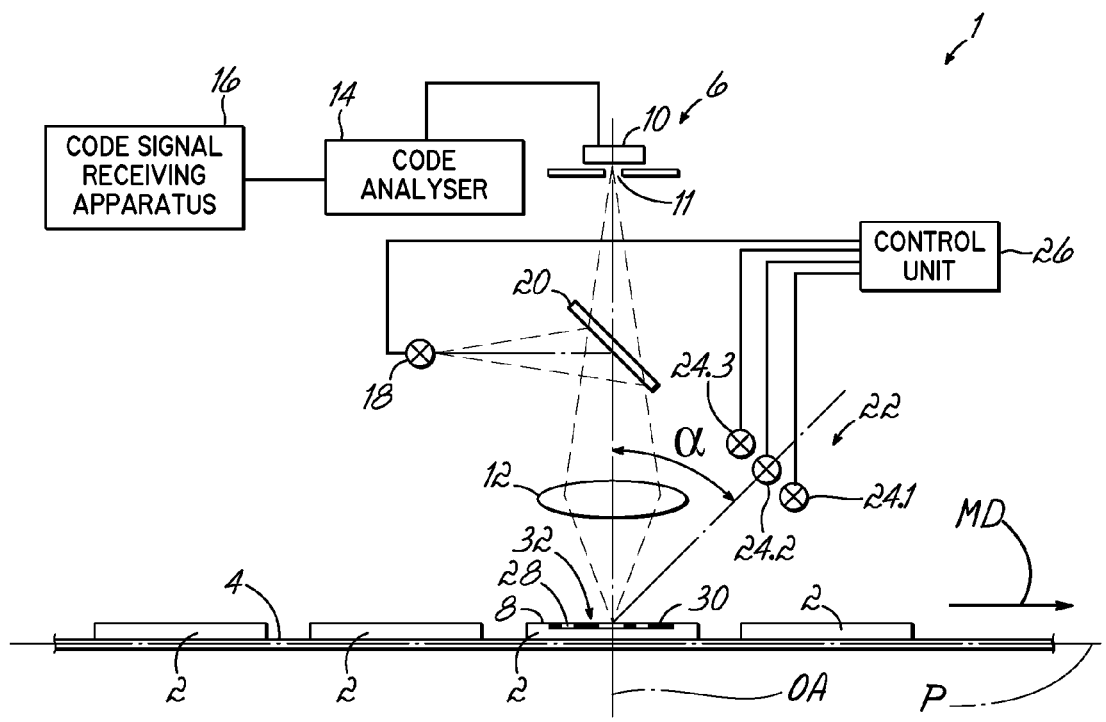
FIG. 2a shows a schematic view of a second embodiment of an optical sensor.

FIG. 2a shows a schematic representation of a second embodiment of the optical sensor according to the invention.

In the example of FIG. 2a the second illumination source 22 comprises a plurality of light sources 24.$i$ ($i=1, 2, \ldots$), e.g., a plurality of light emitting diodes (LEDs). In this example, the light sources 24.1, 24.2 and 24.3 are arranged to emit light of mutually different colours. In this example the red light source 24.1 emits red light, the green light source 24.2 emits green light and the blue light source 24.3 emits blue light. It will be appreciated that other colours are possible as well. In general, it is possible that at least two light sources of the plurality of light sources 24.$i$ are arranged to emit light of mutually different colours. In this example, the first illumination source 18 emits substantially white light.

In this example, the control unit 26 is further arranged for, in the second operational mode, consecutively switching on one of the light sources 24.$i$, while the remaining light sources are switched off. Hence, in this example, the substrate may, in the second operational mode, be consecutively be illuminated with red, green and blue light. Hence, in the example of FIG. 2a, the substrate is illuminated in a cycle, e.g., a continuously repeating cycle, of white, red, green and blue light.

Additionally, in this example the control unit 26 has a third operational mode wherein the first and the second illumination source 18,22 are switched off. Hence, in the third operational mode the substrate 2 is not illuminated by the optical sensor 1. In this third operational mode the optical detector can determine an amount of background lighting which is independent of the chosen illumination source. The optical detector may determine a "dark" value of the reflective property in the third operational mode which may be used for calibration or correction of the values determined during the first and/or second operational modes.

Figure 2B:
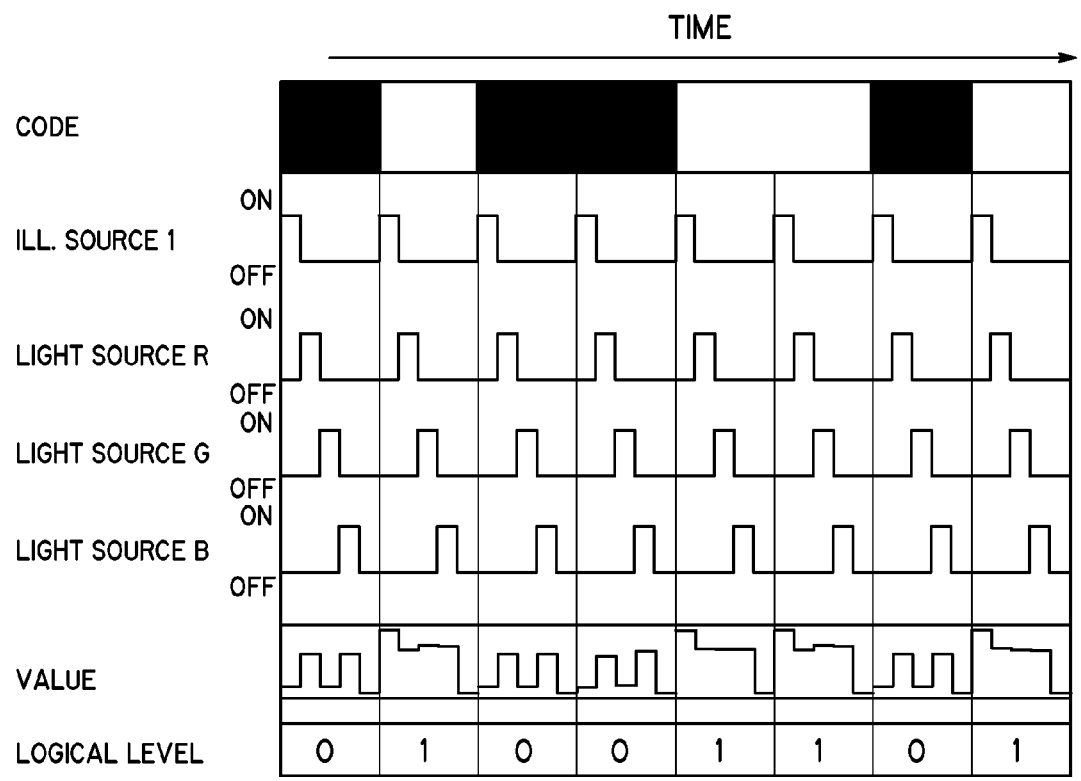
FIG. 2b shows a schematic representation of the functioning of the optical sensor of FIG. 2a in time.

In the example of FIG. 2a, the control unit 26 is arranged for cyclically being in the first, second or third operational mode. Hence, in the example of FIG. 2a, the substrate 2 is illuminated in a cycle, e.g., a continuously repeating cycle, of white, red, green and blue light followed by a dark period. FIG. 2b schematically shows at which moments in time the first illumination source 18 and the light sources 24.$i$ are switched on or off.

It will be appreciated that in order to obtain detected values of the reflective property of each first or second region 28,30 of the code for each of the, in this example, five illuminating and dark periods, while achieving a high moving speed of the substrate (e.g., more than 10 m/s) the illuminating and dark periods need to be short. In a typical application, the cycle time of the control unit is 10 µs, wherein the periods of illumination with the first illumination source 18, the red light source 24.1, the green light source 24.2 and the blue light source 24.3 and the dark period each amount 2 µs. It will be appreciated that the fast response of the singular photodiode makes it a highly suitable photoelectric transducer to be used in conjunction with this short cycle time.

The analyser 14 can determine the logical levels of the code as explained with respect to FIG. 1b.

In the example of FIG. 2b the code comprises white first regions 28 and purple second regions 30. It can be seen from FIG. 2b that the optical detector 6 determines high values of the reflective property when the white first region 28 is imaged at the optical detector 6, in this example when illuminated by the white first illumination source 18 and when illuminated by the red, green and blue light source 24.1, 24.2, 24.1. It can also be seen from FIG. 2b that the optical detector 6 determines low values of the reflective property when the purple second region 30 is imaged at the optical detector 6, in this example when illuminated by the white first illumination source 18 and when illuminated by the green light source 24.2. When, however, the purple second region is illuminated by the red or blue light source 24.1,24.3, the optical detector determines a high value of the reflective property. Thus, the analyser 14 may decide that the second region 30 is purple, since it comprises red and blue colour components, as indicated by the high value of the reflective property when illuminated by the red and blue light source 24.1,24.3.

Hence, in addition to the logical levels of the code, the analyser may also determine colour components of a first and/or second region of the code, and hence a colour of the first and/or second region of the code. The analyser may e.g., on the basis of at least one ratio of values of the reflective property obtained when illuminating with mutually different colours determine a colour of a portion of the substrate, e.g., of a region of the code.

Figure 3:
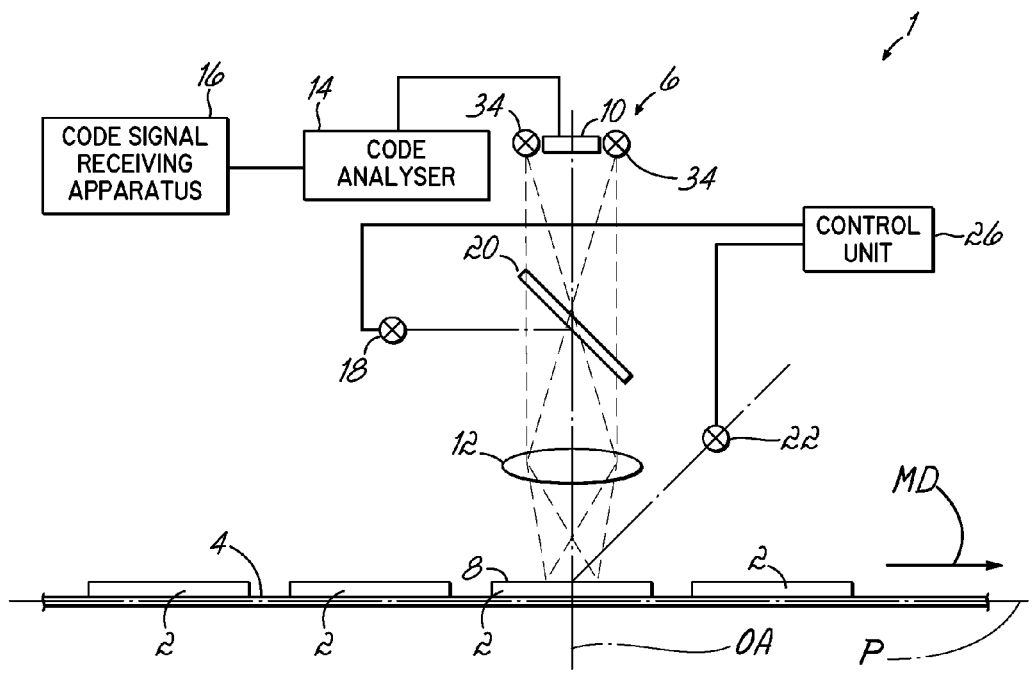
FIG. 3 shows a schematic representation of a third embodiment of an optical sensor.

FIG. 3 shows a schematic representation of a third embodiment of the optical sensor according to the invention. According to a second aspect of the invention the optical sensor 1 comprises at least one, in this example two, alignment light source 34 which is arranged adjacent to the photoelectric transducer 10, and which is arranged to be imaged onto the substrate 2 by the imaging optics 12. Preferably the alignment light source 34 is mounted such that when the substrate 2 is focussed at the photoelectric transducer 10, the alignment light source is focussed at the substrate 2. Hence, the optical sensor can be easily aligned such that the substrate is focussed at the photoelectric transducer by simply observing the projection of the alignment light source on the substrate. It will be appreciated that the alignment can be performed by visually observing the projection, or by automatically observing the projection, e.g., using a camera. It will be appreciated that the alignment light source can also be used in the embodiment shown in FIGS. 2a and 4. It will also be appreciated that the alignment light source can also be used in an optical sensor which does not comprises the first illumination source or does not comprise the second illumination source.

Figure 4:
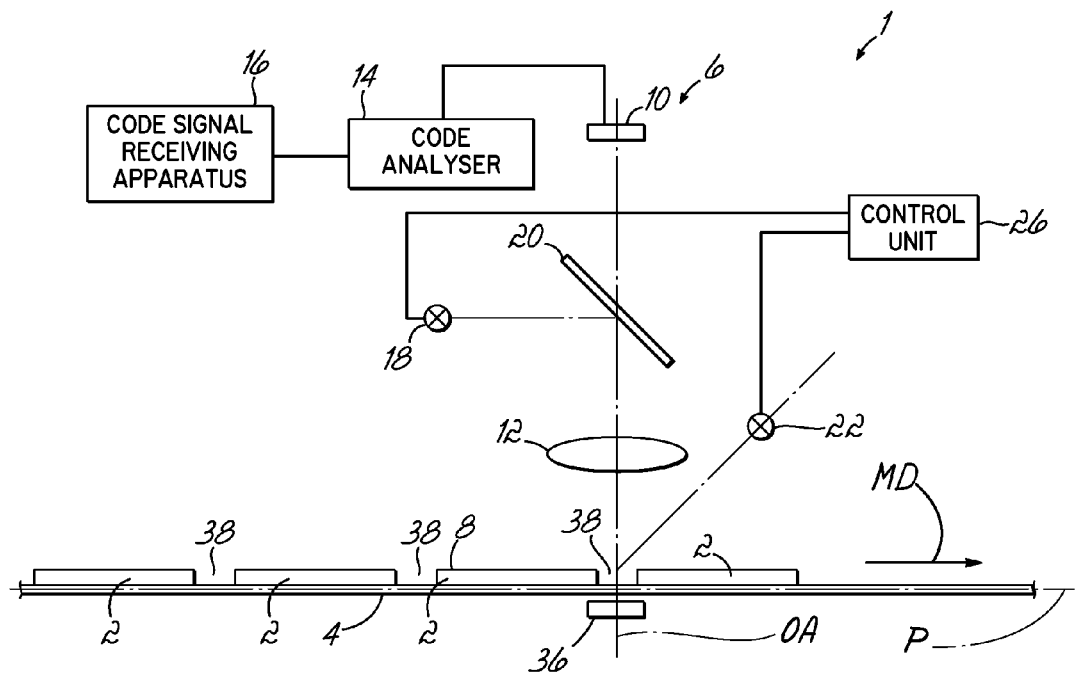
FIG. 4 shows a schematic representation of a fourth embodiment of an optical sensor.

FIG. 4 shows a schematic representation of a fourth embodiment of the optical sensor according to the invention. According to a third aspect of the invention the optical sensor 1 comprises a reference surface 36 which, in use, is positioned behind the substrate 2 when viewed from the optical detector 6. When a plurality of substrates, e.g., blanks for boxes, pass the optical axis OA in the moving direction MD with spaces 38 left between two neighbouring substrates of the plurality of substrates, light from the first and/or second illumination source 18, 22 may pass between two substrates to be incident on the reference surface 36. The optical detector 6 may view the reference surface 36 through the space 38. The reference surface may be chosen such that the value of the reflective property determined by the optical detector has a predetermined reference value, or lies within a predetermined interval. In a special embodiment the reference surface is a retro-reflective surface which reflects substantially all light from the first illumination source 18 in the direction of the optical detector 6. Hence, the reference value may be a large value. The reference surface may be used to discriminate between a first situation wherein there is a substrate in the field of view of the optical detector and a second situation wherein there is no substrate, but a space 38, in the field of view of the optical detector 6. This may for instance be used to generate a trigger signal which indicates, e.g., a leading edge of, an next substrate entering the field of view. This in turn may be used by the analyser 14 for determining a moment in time when a code is expected to be seen when a distance between the leading edge of the substrate 2 and a leading edge of the code is known. Hence, the analyser is arranged for determining the beginning of the code on the basis of the detected reflective property. It will be appreciated that the analyser may also be arranged for determining the beginning of a code on the basis of the detected reflective property of a portion of the substrate itself.

In the example of FIG. 2a, the first illumination source is a white illumination source. It has been found that illumination substantially perpendicular to the substrate with a white light source in combination with multi-coloured illumination at a non-zero angle with respect to the substrate provides sufficient information to determine most common codes and colour information. Further, using the white illumination instead of consecutive multi-coloured illumination at the first illumination source reduces the number of illumination steps in the cycle of the control unit. This allows to choose a shorter cycle time which enhances the speed of the optical detector. In the foregoing specification, the invention has been described with reference to specific examples of embodiments of the invention. It will, however, be evident that various modifications and changes may be made therein without departing from the broader spirit and scope of the invention as set forth in the appended claims.

For example, the first illumination source may emit light of a predetermined colour or comprise a plurality of light sources of mutually different colours.

The plurality of light sources of mutually different colours may also be formed by a single light source arranged to consecutively emit light of mutually different colours.

In the examples the substrate is illuminated by either the first or the second illumination source. It is also possible that the substrate is illuminated by both illumination sources at the same time. In the examples the substrate is illuminated by only one of the light sources at a single moment. It is also possible that the substrate is illuminated by at least two light sources simultaneously.

In the examples, the optical sensor comprises a first and second illumination source. However, optionally a third or further illumination source may be added, e.g., at a non-zero angle with respect to both the first and second illumination source.

In the examples the code comprises binary code. It is also possible that other forms of code are used such as ternary or other multi-level codes, colour codes, length codes etc.

All such varieties are considered to be within the scope of the invention. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other items or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

While the present invention has been illustrated by a description of various embodiments and while these embodiments have been described in some detail, it is not the intention of the Applicant to restrict or in any way limit the scope of the appended claims to such detail. Additional advantages and modifications will readily appear to those skilled in the art. The various features disclosed herein may be used alone or in any combination depending on the needs and preferences of the user. The scope of the invention itself should only be defined by the appended claims.

What is claimed is:

1. Optical sensor for detecting a code on a substrate which, in use, moves with respect to the optical sensor, comprising an optical detector including imaging optics for imaging the substrate onto the optical detector, the optical detector continuously or repeatedly determining a value of a reflective property of the substrate, wherein the optical detector, in use, views the substrate along an optical axis, an alignment light source disposed adjacent to the optical detector and imaged onto the substrate by the imaging optics such that the substrate is focused at the optical detector by using a projection of the alignment light source directed along the optical axis onto the substrate, a code analyzer for determining the detected code on the basis of a variation of the value of the determined reflective property in time, a first illumination source for illuminating the substrate along the optical axis of the optical detector, a second illumination source for illuminating the substrate in a direction at a non-zero angle with respect to the optical axis, and a control unit having a first operational mode wherein the first illumination source is switched on and the second illumination source is switched off, and having a second operational mode wherein the first illumination source is switched off and the second illumination source is switched on, and having a third operational mode wherein the first illumination source and the second illumination source are switched off and the code analyzer is calibrated by determining an amount of ambient light present, wherein the control unit is arranged for cyclically being in the first, second or third operational mode.

2. Optical sensor according to claim 1, wherein the optical axis is arranged substantially perpendicular to the substrate.

3. Optical sensor according to claim 1, comprising a beam combiner for combining a beam of light from the first illumination source into the optical path of the optical detector.

4. Optical sensor according to claim 1, wherein the first illumination source is arranged for emitting white light.

5. Optical sensor according to claim 1, wherein at least one of the first or second illumination sources comprises a plurality of light sources.

6. Optical sensor according to claim 5, wherein at least two light sources of the plurality of light sources are arranged to emit light of mutually different colors.

7. Optical sensor according to claim 6, wherein the plurality of light sources comprises a red light source for emitting red light, a green light source for emitting green light and a blue light source for emitting blue light.

8. Optical sensor according to claim 6 wherein the control unit is arranged for use in at least one of the first or second operational modes consecutively activating the at least two light sources of mutually different colors.

9. Optical sensor according to claim 1, wherein at least one of the first or second illumination sources comprises a light emitting diode.

10. Optical sensor according to claim 1, wherein the optical detector comprises a photoelectric transducer.

11. Optical sensor according to claim 10, wherein the photoelectric transducer is a singular photodiode.

12. Optical sensor according to claim 10, wherein the photoelectric transducer does not comprise a plurality of photoelectric cells.

13. Optical sensor according to claim 1, wherein the imaging optics comprise a lens.

14. Optical sensor according to claim 1, wherein the control unit is arranged for periodically changing from the first to the second operational mode.

15. Optical sensor according to claim 1, wherein the code analyzer is arranged for determining the beginning of a code on the basis of the detected reflective property.

16. Optical sensor according to claim 15, wherein the optical sensor is further provided with a reference surface which, in use, is positioned behind the substrate when viewed from the optical detector.

17. Method for detecting a code on a substrate which, in use, moves with respect to an optical detector, comprising imaging the substrate onto the optical detector with imaging optics, continuously or repeatedly determining a value of a reflective property of the substrate along an optical axis of the optical detector, aligning the substrate along the optical axis with an alignment light source disposed adjacent to the optical detector and imaged onto the substrate by the imaging optics, determining the detected code on the basis of a variation of the value of the determined reflective property in time, illuminating the substrate along the optical axis with a first illumination source, illuminating the substrate in a direction at a non-zero angle with respect to the optical axis with a second illumination source, in a first operational mode having the first illumination source switched on and the second illumination source switched off, in a second operational mode having the first illumination source switched off and the second illumination source switched on, in a third operational mode having the first illumination source and the second illumination source switched off, and cycling periodically between the first, second, and third operational modes to determine the reflective property of the substrate and to calibrate for any amount of ambient light present.

18. Method according to claim 17, wherein the optical axis is arranged substantially perpendicular to the substrate.

19. Method according to claim 17, wherein the first illumination source is arranged for emitting white light.

20. Method according to claim 17, comprising emitting light of mutually different colors using at least one of the first or second illumination sources.

21. Method according to claim 17, wherein the optical detector is a photoelectric transducer.

* * * * *